(12) United States Patent
Takeda et al.

(10) Patent No.: US 10,743,304 B2
(45) Date of Patent: Aug. 11, 2020

(54) USER TERMINAL, RADIO BASE STATION, AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 101 days.

(21) Appl. No.: 15/742,123

(22) PCT Filed: Jul. 6, 2016

(86) PCT No.: PCT/JP2016/069967
§ 371 (c)(1),
(2) Date: Jan. 5, 2018

(87) PCT Pub. No.: WO2017/014048
PCT Pub. Date: Jan. 26, 2017

(65) Prior Publication Data
US 2018/0199322 A1 Jul. 12, 2018

(30) Foreign Application Priority Data
Jul. 17, 2015 (JP) .................................. 2015-143157

(51) Int. Cl.
| | | |
|---|---|---|
| *H04W 72/04* | (2009.01) | |
| *H04J 11/00* | (2006.01) | |
| *H04L 27/01* | (2006.01) | |
| *H04W 28/06* | (2009.01) | |
| *H04L 5/14* | (2006.01) | |
| *H04L 5/00* | (2006.01) | |

(Continued)

(52) U.S. Cl.
CPC ........... *H04W 72/044* (2013.01); *H04J 11/00* (2013.01); *H04L 5/0053* (2013.01);
(Continued)

(58) Field of Classification Search
CPC ... H04W 72/044; H04W 72/04; H04W 28/06; H04L 5/0053; H04L 5/1469; H04L 27/01; H04L 5/0007; H04L 5/0096; H04L 5/001; H04L 1/0003; H04L 1/1812
See application file for complete search history.

(56) References Cited

U.S. PATENT DOCUMENTS

| | | | | |
|---|---|---|---|---|
| 2011/0032894 | A1* | 2/2011 | Miki | H04L 1/1854 370/329 |
| 2016/0353436 | A1* | 12/2016 | Au | H04L 5/1469 |
| 2017/0290008 | A1* | 10/2017 | Tooher | H04L 1/0007 |

FOREIGN PATENT DOCUMENTS

JP 2016-072843 A 5/2016

OTHER PUBLICATIONS

Extended European Search Report issued in corresponding European Application No. 16827610.3, dated Jan. 7, 2019 (11 pages).
(Continued)

*Primary Examiner* — Jackie Zuniga Abad
(74) *Attorney, Agent, or Firm* — Osha Liang LLP

(57) ABSTRACT

According to the present invention, communication is carried out using a transmission time interval (TTI) that is suitable for a future radio communication system. A user terminal of the present invention includes a receiving section configured to receive a downlink signal; a transmitting section configured to transmit an uplink signal; and a control section configured to control a transmission time interval (TTI) used in reception of the downlink signal and/or used in transmission of the uplink signal. The control section sets a second transmission time interval (TTI) that is shorter than a 1 ms first transmission time interval (TTI).

4 Claims, 14 Drawing Sheets

(51) Int. Cl.
    *H04L 1/00*         (2006.01)
    *H04L 1/18*         (2006.01)
(52) U.S. Cl.
    CPC ............ *H04L 5/1469* (2013.01); *H04L 27/01*
        (2013.01); *H04W 28/06* (2013.01); *H04W*
        *72/04* (2013.01); *H04L 1/0003* (2013.01);
        *H04L 1/1812* (2013.01); *H04L 5/001*
        (2013.01); *H04L 5/0007* (2013.01); *H04L*
        *5/0096* (2013.01)

(56) References Cited

OTHER PUBLICATIONS

Eeva Lahetkangas, et al.; "On the Flexible 5G Dense Deployment Air Interface for Mobile Broadband"; 2014 1st International Conference on 5G for Ubiquitous Connectivity (5GU), pp. 57-61, XP032735066; Nov. 26, 2014 (5 pages).
International Search Report of the International Searching Authority issued in PCT/JP2016/069967 dated Sep. 6, 2016 (2 pages).
Written Opinion of the International Searching Authority issued in PCT/JP2016/069967 dated Sep. 6, 2016 (4 pages).
Ericsson; "Areas for reducing latency"; 3GPP TSG-RAN WG2 #90, Tdoc R2-152415; Fukuoka, Japan; May 25-29, 2015 (4 pages).
Horikoshi; "5G ga Motarasu Nippon no Kiro"; Nikkei Communications, No. 618, Jun. 29, 2015, pp. 22-29 (10 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)"; May 2008 (134 pages).

\* cited by examiner

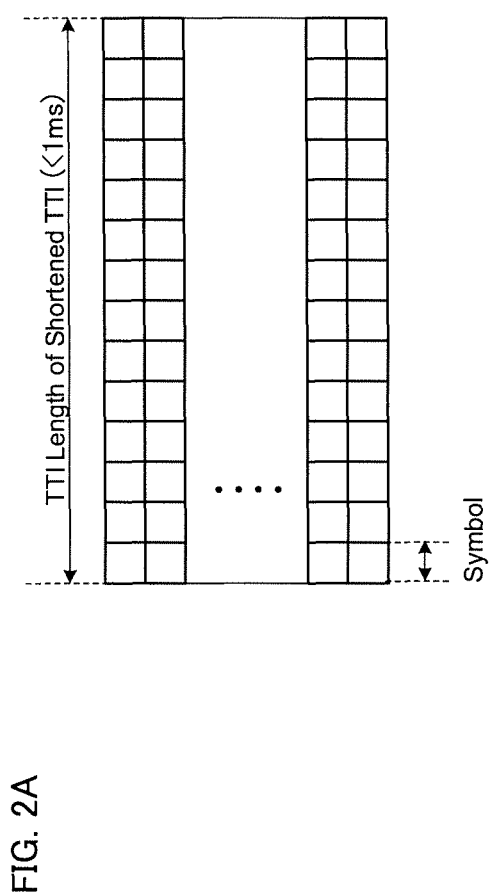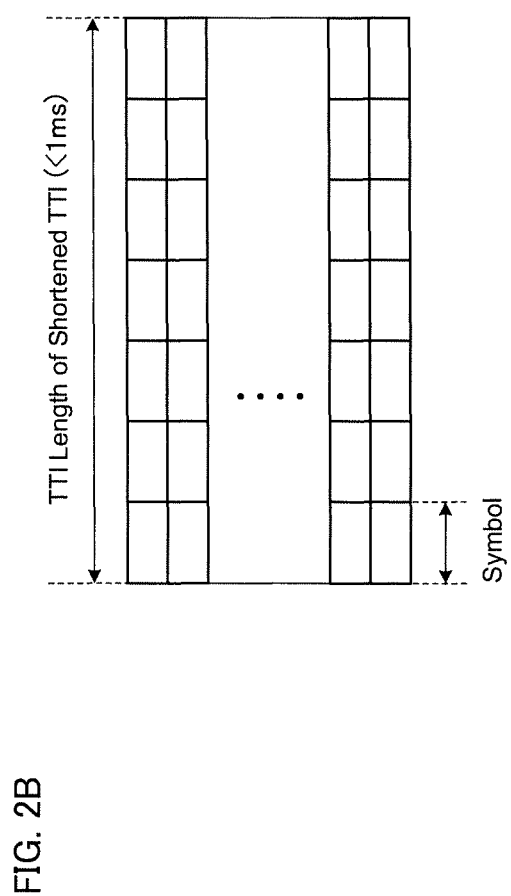
FIG. 2A
FIG. 2B

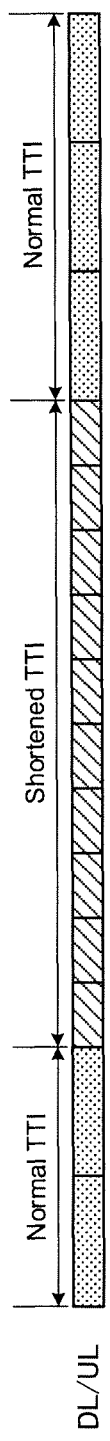
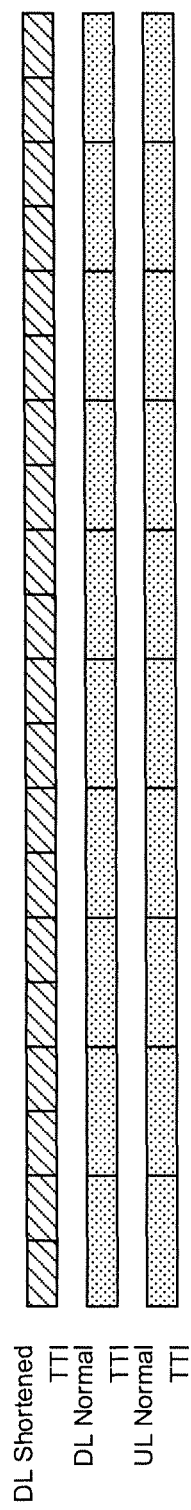
FIG. 3A
FIG. 3B
FIG. 3C

| UL-DL Configuration | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D — DL Subframe
U — UL Subframe
S — Special Subframe

FIG. 4

USER TERMINAL, RADIO BASE STATION, AND RADIO COMMUNICATION METHOD

TECHNICAL FIELD

The present invention relates to a user terminal, a radio base station and a radio communication method in a next-generation mobile communication system.

BACKGROUND ART

In a UMTS (Universal Mobile Telecommunications System) network, long-term evolution (LTE) has been standardized for the purpose of further increasing high-speed data rates and providing low delay, etc. (non-patent literature 1). For the purpose of achieving further broadbandization and higher speed from LTE (also called LTE Rel. 8), LTE advanced (which are called LTE Rel. 10, 11, or 12) has been formally specified, and successor systems (also called LTE Rel. 13) thereto have also been studied.

In LTE Rel. 10/11, in order to achieve broadbandization, carrier aggregation (CA) which combines a plurality of component carriers (CCs) is implemented. Each CC is configured as a single unit of the LTE Rel. 8 system frequency band. Furthermore, in CA, a plurality of CCs of the same radio base station (eNB: eNodeB) are configured in the user terminal (UE: User Equipment).

Whereas, in LTE Rel. 12, dual connectivity (DC) is also implemented, in which a plurality of cell groups (CGs) of different radio base stations are configured in a user terminal. Each cell group is configured of at least one cell (CC). In DC, since a plurality of CCs of different radio base stations are combined, DC is also called "Inter-eNB CA", etc.

Furthermore, LTE Rel. 8 through 12 implement frequency division duplex (FDD) which carries out downlink (DL) transmission and uplink (UL) transmission at different frequencies, and time division duplex (TDD) which periodically switches between downlink transmission and uplink transmission.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2".

SUMMARY OF INVENTION

Technical Problem

In the above-described existing system (LTE Rel. 8 through 12), the transmission time interval (TTI) is 1 ms. TTI may also be called "subframe length".

Whereas, in future radio communication systems such as LTE Rel. 13 onwards or 5G, etc., the carrying out of communication at a high frequency of several scores of GHz, etc., or communication of relatively small data amounts such as in IoT (Internet of Things), MTC (Machine Type Communication) and M2M (Machine to Machine), etc., are envisaged. In such future radio communication systems, if a transmission time interval (TTI) of 1 ms of an existing system is used, there is a risk of not being able to carry out a sufficient communication service.

The present invention has been devised in view of the above discussion, and it is an object of the present invention to provide a user terminal, a radio base station and a radio communication method which can carry out communication at a transmission time interval that is appropriate for a future radio communication system.

Solution to Problem

A user terminal of an aspect of the present invention includes a receiving section configured to receive a downlink signal; a transmitting section configured to transmit an uplink signal; and a control section configured to control a transmission time interval (TTI) used in reception of the downlink signal and/or used in transmission of the uplink signal. The control section sets a second transmission time interval (TTI) that is shorter than a 1 ms first transmission time interval (TTI).

Technical Advantageous of Invention

According to the present invention, communication at a transmission time interval that is appropriate for a future radio communication system can be carried out.

BRIEF DESCRIPTION OF DRAWINGS

FIGS. 2A and 2B are diagrams showing configuration examples of a shortened TTI, according to the present invention.

FIGS. 3A, 3B and 3C are diagrams showing setting examples of shortened TTIs, according to the present invention.

FIG. 4 is a diagram showing UL-DL configurations in TDD.

DESCRIPTION OF EMBODIMENTS

Figure 1:
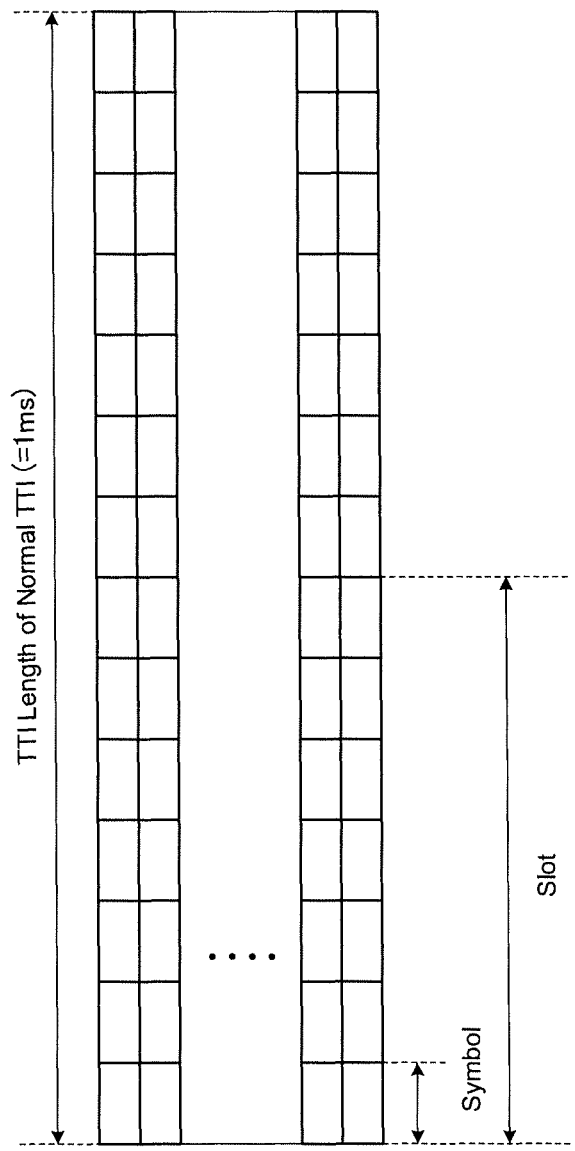
FIG. 1 is a diagram showing a configuration example of a normal TTI.

FIG. 1 is an explanatory diagram of an example of a transmission time interval (TTI) in LTE Rel. 8 through 12. As shown in FIG. 1, TTI in LTE Rel. 8 through 12 (hereinafter referred to as "normal TTI") has a time length of 1 ms. Normal TTI is also called a "subframe", and is configured of two time slots. Normal TTI is a transmission time unit of one channel-encoded data packet, and is a processing unit for scheduling and link adaptation, etc.

In the downlink (DL), in the case of a normal cyclic prefix (CP), the normal TTI is configured to include 14 OFDM (Orthogonal Frequency Division Multiplexing) symbols (7 OFDM symbols per slot), as shown in FIG. 1. Each OFDM symbol has a time length (symbol length) of 66.7 μs and a 4.76 μs normal CP is added thereto. Since the symbol length and the subcarrier interval mutually have an inverse relationship, in the case of a symbol length of 66.7 μs, the subcarrier interval is 15 kHz.

Furthermore, in the uplink (UL), in the case of a normal cyclic prefix (CP), the normal TTI is configured to include 14 SC-FDMA (Single Carrier Frequency Division Multiple Access) symbols (7 SC-FDMA symbols per slot). Each SC-FDMA symbol has a time length (symbol length) of 66.7 μs and a 4.76 μs normal CP is added thereto. Since the symbol length and the subcarrier interval mutually have an inverse relationship, in the case of a symbol length of 66.7 μs, the subcarrier interval is 15 kHz.

Note that, although not shown in the drawings, in the case of an enhanced CP, the normal TTI may be configured to include 12 OFDM symbols (or 12 SC-FDMA symbols). In such a case, each OFDM symbol (or each SC-FDMA symbol) has a time length of 66.7 μs and a 16.67 μs enhanced CP is added thereto.

In future radio communication systems such as LTE Rel. 13 onwards or 5G, etc., there is a need for a radio interface suitable for a high frequency of several scores of GHz, etc., or a radio interface that has a small packet size while having minimal delay in order to be suitable for relatively small data amounts such as in IoT (Internet of Things), MTC (Machine Type Communication) and M2M (Machine to Machine), etc.

However, in the case where a TTI (hereinafter, referred to as a "shortened TTI") having a time length that is shorter than a normal TTI is used, since the timing margin for processes (e.g., encoding and decoding) that are performed in the user terminal and in the radio base station increases, processing delays can be reduced. Furthermore, if a shortened TTI is used, the number of user terminals that can be accommodated per unit of time (e.g., 1 ms) can be increased.

Consequently, the inventors of the present invention conceived the idea of using a shortened TTI as a radio interface which has a small packet size, but delay is minimalized, thereby arriving at the present invention. Specifically, in an aspect of the user terminal of the present invention, a transmission time interval (TTI), is controlled, which is used in reception of downlink (DL) signals and/or transmission of uplink (UL) signals. Furthermore, in an aspect of the user terminal, a shortened TTI (second transmission time interval) is set which is shorter than the normal TTI (first transmission time interval) of 1 ms.

Details of an embodiment according to the present invention will be discussed hereinbelow. Hereinafter, the transmission time unit of a time length that is shorter than a normal TTI (1 ms) will be referred to as a shortened TTI, however, the shortened TTI may be referred to as a transmission time interval, a transmission unit or time unit, etc. Furthermore, the shortened TTI is a transmission time unit of one channel-encoded data packet, and is a processing unit for scheduling and link adaptation, etc.

Furthermore, in the present invention, the shortened TTI is configured with OFDM symbols in the downlink and is configured with SC-FDMA symbols in the uplink, however, the present invention is not limited thereto. The UL shortened TTI may be configured with OFDM symbols. Furthermore, OFDM symbols and SC-FDMA symbols may be mixed within the shortened TTI. Hereinafter, "symbols" will refer to generally to OFDM symbols and SC-FDMA symbols, etc.

(Shortened TTI Configuration Example)

A configuration example of a shortened TTI used in the illustrated embodiments will be described hereinbelow. FIG. 2 is a configuration example of a shortened TTI. As shown in FIGS. 2A and 2B, the shortened TTI has a time length (TTI length) that is smaller than 1 ms. The shortened TTI may have a TTI length of, e.g., 0.5 ms, 0.2 ms or 0.1 ms, etc., so that the multiple thereof becomes 1 ms. Accordingly, the shortened TTI can be implemented while maintaining compatibility with a 1 ms normal TTI.

FIG. 2A is a diagram showing a first configuration example of the shortened TTI. As shown in FIG. 2A, in the first configuration example, the shortened TTI is configured by the same number of symbols (14 symbols in this example) as those of the normal TTI, and each symbol has a shorter symbol length than that of the normal TTI symbol length (=66.7 μs).

As shown in FIG. 2A, if the symbol length is shortened while maintaining the same number of symbols of the normal TTI, the physical layer signal configuration of the normal TTI can be utilized. Furthermore, if the number of symbols of the normal TTI can be maintained, the same amount of information (amount of bits) as that of the normal TTI can be included in the shortened TTI. On the other hand, the CP overhead increases, so that the shortened TTI signals shown in FIG. 2A and the signals of the normal TTI cannot be multiplexed.

Furthermore, since the symbol length and the subcarrier interval mutually have an inverse relationship, if the symbol length is shortened as shown in FIG. 2A, the subcarrier interval becomes wider than that of the normal TTI of 15 kHz. If the subcarrier interval widens, interchannel interference caused by a Doppler shift occurring when the user terminal is moving, and deterioration in transmission quality caused by phase noise of a receiver of the user terminal can be effectively prevented. In particular, in a high frequency of several scores of GHz, etc., deterioration in transmission quality can be effectively prevented by widening the subcarrier interval.

FIG. 2B is a diagram showing a second configuration example of the shortened TTI. As shown in FIG. 2B, in the second configuration example, the shortened TTI is configured by a smaller number of symbols than that of the normal TTI, and each symbol has the same symbol length (=66.7 μs) as that of the normal TTI symbol length. For example, in FIG. 2B, if the shortened TTI has half the time length (0.5 ms) of that of the normal TTI, the shortened TTI is configured of half the number of symbols (7 symbols in this case) of the normal TTI.

As shown in FIG. 2B, in the case where the number of symbols are reduced while maintaining the symbol length, the amount of information (amount of bits) included in the shortened TTI can be reduced more than that of the normal TTI. Accordingly, the user terminal can carry out a reception process (e.g., demodulation, decoding, etc.) of the information included in the shortened TTI in a shorter time than that of the normal TTI, so that processing delay can be reduced. Furthermore, the shortened TTI signal shown in FIG. 2B and the signal of the normal TTI can be multiplexed (e.g., OFDM multiplexing) in the same CC, so that compatibility with the normal TTI can be maintained.

Note that descriptions in regard to FIGS. 2A and 2B are given for the case of a normal CP (in the case where the normal TTI is configured of 14 symbols), however, the configuration of the shortened TTI is not limited thereto. For example, in the case of an enhanced CP, the shortened TTI of FIG. 2A may be configured of 12 symbols, and the shortened TTI of FIG. 2B may be configured of 6 symbols. Hence, the shortened TTI only needs to have a shorter time length than that of the normal TTI, and any kind of configuration is possible within the shortened TTI, such as the number of symbols, symbol length, CP length, etc.

(Shortened TTI Setting Example)

A description of a setting example for the shortened TTI, which is used in the illustrated embodiments, will be described hereinbelow. In the illustrated embodiments, the user terminal may be configured so that both the normal TTI and the shortened TTI can be set therein in order to be compatible with LTE Rel. 8 through 12. FIG. 3 shows diagrams of setting examples for normal TTI and shortened TTI. Note that FIG. 3 merely shows examples; the present invention is not limited thereto.

FIG. 3A is a diagram showing a first setting example of shortened TTIs. As shown in FIG. 3A, the normal TTIs and the shortened TTIs may be mixed within the same CC (frequency domain) in a time-wise manner. Specifically, each shortened TTI may be set within a specified subframe (or a specified time unit of a specified radio frame) within the same CC. For example, in FIG. 3A, shortened TTIs are set in five continuous subframes and normal TTIs are set in the other subframes within the same CC. Note that the number and position of the subframes at which the shortened TTIs are set are not limited to those indicated in FIG. 3A.

FIG. 3B is a diagram showing a second setting example of shortened TTIs. As shown in FIG. 3B, the normal TTI CCs and the shortened TTI CCs may be combined to carry out carrier aggregation (CA) or dual connectivity (DC). Specifically, the shortened TTIs may be set to specified CCs (more specifically, a DL and/or a UL of a specified CC). For example, in FIG. 3B, shortened TTIs are set at DLs of specified CCs, and normal TTIs are set at DLs and ULs of other CCs. Note that the number and position of the CCs at which the shortened TTIs are set are not limited to those indicated in FIG. 3B.

Furthermore, in the case of CA, the shortened TTIs may be set in specified CCs (Primary (P) cell and/or Secondary (S) cell) in the same radio base station. Whereas, in the case of DC, the shortened TTIs may be set in specified CCs (Primary (P) cells and/or Secondary (S) cells) in a master cell group (MCG) formed by a first radio base station, or may be set in specified CCs (Primary secondary (PS) cells and or S cells) in a secondary cell group (SCG) formed by a second radio base station.

FIG. 3C is a diagram showing a third setting example of shortened TTIs. As shown in FIG. 3C, the shortened TTIs may be set to the DL or the UL. For example, in FIG. 3C, in a TDD system, the UL is set to normal TTIs and the DL is set to shortened TTIs.

Furthermore, a specified channel or signal of the DL or the UL may be allocated (set) to a shortened TTI. For example, an uplink control channel (PUCCH: Physical Uplink Control Channel) may be allocated to a normal TTI and an uplink shared channel (PUSCH: Physical Uplink Shared Channel) may be allocated to a shortened TTI.

(Shortened TTI Notification Example)

In the above-described shortened TTI setting example, the user terminal can set (and/or detect) a shortened TTI based on implicit or explicit notification from the radio base station. Hereinbelow, a shortened TTI notification example will be described (1) for the case of implicit notification, or for the case of explicit notification by at least one of (2) broadcast information or RRC (Radio Resource Control) signaling, (3) MAC (Medium Access Control) signaling, and (4) PHY (Physical) signaling.

(1) In the case of implicit notification, the user terminal may set (e.g., determine that a cell, channel or signal, etc., that carries out communication, is a shortened TTI) the shortened TTI based on the frequency band (e.g., a band for 5G, unlicensed band, etc.), system bandwidth (e.g., 100 MHz, etc.), whether or not LBT (Listen Before Talk) in LAA (License Assisted Access) is applied, the type of data that is transmitted (e.g., control data, audio, etc.), a logical channel, a transport block, an RLC (Radio Link Control) mode, and a C-RNTI (Cell-Radio Network Temporary Identifier), etc.

(2) In the case of broadcast information or RRC signaling (higher layer signaling), the shortened TTI may be set based on setting information notified from the radio base station to the user terminal by broadcast information or RRC signaling. This setting information indicates, e.g., which CC and/or subframe to use for a shortened TTI, and which channel and/or signal to transmit/receive via the shortened TTI, etc. The user terminal semi-statically sets the shortened TTI based on setting information from the radio base station. Note that mode switching between a shortened TTI and a normal TTI may be carried out by an RRC reconfiguration procedure, or in a Pcell may be carried out in an intra-cell handover (HO), or in an Scell may be carried out by a CC (Scell) removal/addition procedure.

(3) In the case of MAC signaling (L2 (Layer 2) signaling), a shortened TTI that is set based on setting information notified by RRC signaling may be activated or deactivated by MAC signaling. Specifically, the user terminal activates or deactivates a shortened TTI based on a L2 control signal (e.g., MAC control elements) from the radio base station. Note that in the Scell, if mode switching is carried out between a shortened TTI and a normal ITT, the Scell may first treat the shortened TTI as deactivated, or that a TA (Timing Advance) timer may be regarded as being expired. Accordingly, a transmission stop interval can be provided for when the mode switching is carried out.

In the case of PHY signaling (L1 (Layer 1) signaling), a shortened TTI that is set based on setting information notified by RRC signaling may be scheduled by PHY signaling. Specifically, the user terminal detects the shortened TTI based on a received or detected L1 control signal (e.g., a downlink control channel (PDCCH: Physical Downlink Control Channel or EPDCCH: Enhanced Physical Downlink Control Channel; herein after "PDCCH/EPDCCH")).

For example, (4-1) the user terminal may recognize the TTI that the PDCCH/EPDCCH, which transmits and received via the shortened TTIs, receives as a shortened ITT Alternatively, (4-2) the user terminal may recognize the TTI (scheduled TTI) that a PDSCH or PUSCH, which is scheduled by (downlink control information (DCI)transmitted by) the PDCCH/EPDCCH, transmits/receives as a shortened TTI. Alternatively, (4-3) the ITT which transmits or receives delivery acknowledgement information (HARQ-ACK: Hybrid Automatic Repeat request-ACKnowledgement) for a PDSCH or PUSCH, which is scheduled by (a DCI transmitted by) the PDCCH/EPDCCH, may be recognized as a shortened TTI.

Furthermore, the user terminal may detect a shortened TTI based on the state (e.g., idle state or connected state) of the user terminal. For example, when in the idle state, the user terminal may detect all TTIs as normal TTIs. Furthermore, in the case of a connected state, the user terminal sets (and/or detects) shortened TTIs based on at least one of the above-described notification examples (1) through (4).

Hereinbelow, details will be described in regard to a radio communication method which uses a shortened TTI that is configured (FIG. 2), set (FIG. 3) or notified as described above. Specifically, the case of TDD (first aspect), the case of DL (second aspect) and the case of UL (third aspect) will be discussed. The radio communication method pertaining to the first through third aspects may be used separately or in combination of at least two aspects thereof.

Note that in the following description, an example is shown in which the shortened TTI is 0.5 ms (half of a normal TTI), however, the time length of the shortened TTI is not limited thereto. The radio communication methods pertaining to the first through third aspects of the invention can be applied in the case where the shortened TTI is other than 0.5 ms.

(First Aspect)

In the case of TDD, a UL-DL configuration, which determines the subframe configuration of the UL and the DL within a radio frame, is used. FIG. 4 is a diagram showing UL-DL configurations. As shown in FIG. 4, in the case of a normal TTI, UL-DL configurations #0 through #6, having different UL subframe and DL subframe allocations, are used. The user terminal is notified by the radio base station, via SIB (System Information Block) 1 or RRC signaling, as to which UL-DL configuration to apply.

In UL-DL configurations #0 through #6 shown in FIG. 4, a special subframe (S) for switching between a DL and a UL is provided between a DL subframe (D) and a UL subframe (U). In the special subframe, a first predetermined number of symbols are used for the DL, and after guard symbols, the remaining symbols are used for the UL. Note that the UL-DL configurations shown in FIG. 4 are merely examples, and the present invention is not limited thereto.

In the above-described UL-DL configurations #0 through #6 assumes a normal TTI. Accordingly, in the case where shortened TTIs are used in TDD, which UL-DL configuration to use becomes a problem. Consequently, in the first aspect of the invention, a UL-DL configuration suitable for a shortened TTI will be described.

In a first aspect of the invention, the radio base station may notify the user terminal of the shortened TTI UL-DL configuration by at least one of RRC signaling, MAC signaling and PHY signaling. Alternatively, the user terminal may determine the shortened TTI UL-DL configuration based on the normal TTI UL-DL configuration notified by the radio base station via SIB1 or RRC signaling.

Figure 5:
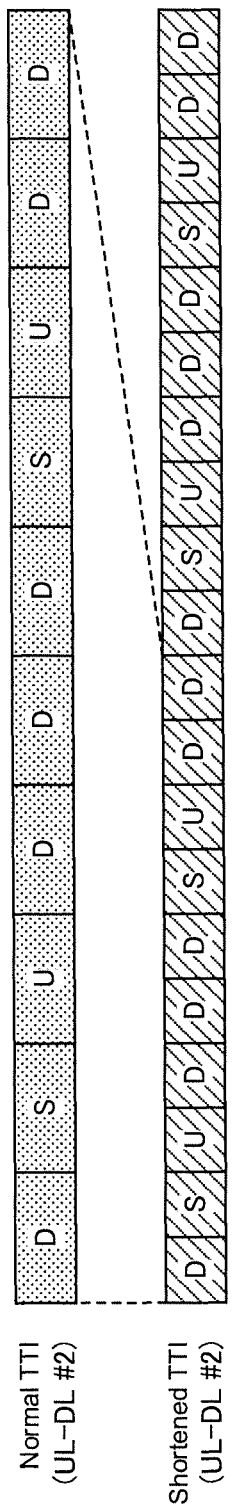
FIG. 5 is a diagram showing a configuration example of a UL-DL configuration for use in the shortened TTI according to a first embodiment.

FIG. 5 is a diagram showing a first configuration example of a shortened TTI UL-DL configuration. As shown in FIG. 5, the shortened TTI UL-DL configuration may be similar to the normal TTI UL-DL configuration. For example, in the case where UL-DL configuration #2 is used in the normal TTI, the shortened TTI can also have DL subframes, UL subframes and special subframes allocated having the same number and the same order as those of UL-DL configuration #2. Whereas, the period of the shortened TTI UL-DL configuration #2 is shortened to half (5 ms in FIG. 5) of the period of the normal TTI UL-DL configuration.

Hence, in the first configuration example, the shortened TTI UL-DL configuration is configured with shortened TTIs in the same pattern (same number and same order) as that of the normal TTI UL-DL configuration, and is configured with a shortened period of that of the normal TTI UL-DL configuration in accordance with the ratio of the time lengths of the normal TTI and the shortened TTI. Accordingly, transmission timing and scheduling timing of DL or UL delivery acknowledgement information (HARQ-ACK) in the case of a normal TTI can be utilized.

Whereas, in the first configuration example, sometimes the transmission directions of the normal TTIs and the shortened TTIs are not the same. For example, in FIG. 5, UL transmission is carried out in the shortened TTI at the $4^{th}$ from the left DL subframe of the normal TTIs. Similarly, DL transmission is carried out in the shortened TTI at the $3^{rd}$ and $8^{th}$ from the left UL subframe of the normal TTIs. Furthermore, UL transmission is carried out in the shortened TTI in the DL symbols at the $2^{nd}$ and $7^{th}$ from the left special subframe of the normal TTIs. In conventional TDD, in the case where mutual operations between a plurality of TDD frequency bands are in synchronization, in which the timing of the DL and the UL are aligned (in other words, a synchronized state and with mutually the same UL-DL configuration), there was the merit of not needing to insert a guard band in between mutual frequency bands, and exhibiting high frequency-reuse. However, in the case where shortened TTIs are utilized as shown in FIG. 5, it is envisaged that a guard band may possibly be required between a normal TTI CC and a shortened TTI CC.

Figure 6:
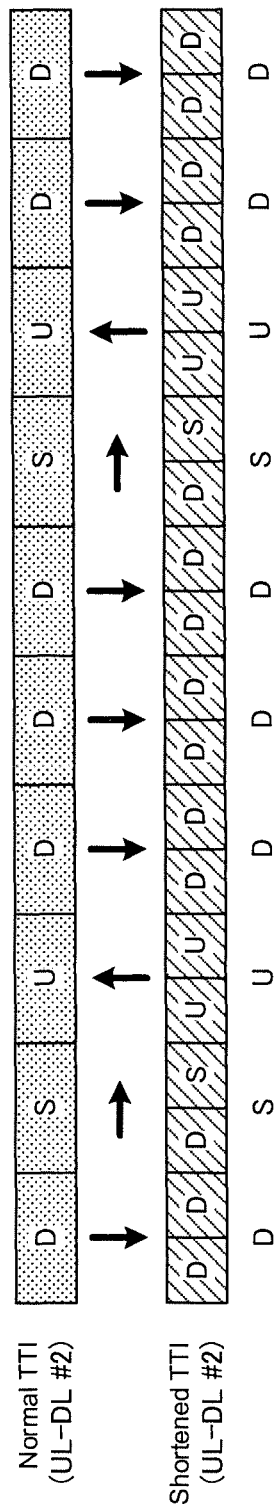
FIG. 6 is a diagram showing a configuration example of a UL-DL configuration for use in the shortened TTI according to the first embodiment.

Consequently, in the second configuration example, the shortened TTI UL-DL configuration is configured to be compatible with the normal TTI UL-DL configuration so that the transmission directions of the normal TTIs and the shortened TTIs are the same. FIG. 6 is a diagram showing the second configuration example of the shortened TTI UL-DL configuration. As shown in FIG. 6, in the shortened TTI UL-DL configuration, the transmission direction of the shortened TTI may be determined so that the transmission directions of the normal TTIs and the shortened TTIs are the same at the same period as that of the normal TTI UL-DL configuration.

As shown in FIG. 6, a shortened TTI DL transmission is carried out at the second-half slot of the $4^{th}$ from the left DL subframe of the normal TTIs, instead of shortened TTI UL transmission (see FIG. 5). Similarly, shortened TTI UL transmission is carried out at the $3^{rd}$ and $8^{th}$ from the left UL subframes of the normal TTIs. Furthermore, a shortened TTI DL transmission is carried out in special subframes at the first-half slots of the $2^{nd}$ and $7^{th}$ from the left normal TTIs, and the second-half thereof is provided with a guard interval, for switching between UL/DL, as a shortened TTI special subframe.

Note that, similar to the normal TTI special subframe, the shortened TTI special subframe may be configured as a DL symbol, a guard symbol or a UL symbol, or may be configured differently to the normal TTI special subframe. For example, when TDD of normal TTIs at adjacent TDD frequencies are operated in synchronization, a shortened TTI special subframe can be configured as a UL symbol(s) at a last OFDM symbol or a plurality of OFDM symbols, and the other remaining OFDM symbols can be configured as guard symbols so as not to interfere with DL symbols, guard symbols and UL symbols included in the special subframe of the normal TTI TDD frequency. In the shortened TTI special subframe, a first OFDM symbol or a plurality of OFDM symbols can be configured as a DL symbol(s), and can be transmitted in an L1 control signal such as a PDCCH, etc.

Hence, in the second configuration example, the shortened TTI UL-DL configuration is configured so that the transmission directions of the normal TTIs and the shortened TTIs are the same at the same period as that of the normal TTI UL-DL configuration. Therefore, in FIG. 6, even in the case where a CC of a normal TTI and a CC of a shortened TTI use adjacent carriers within the same band, interference (UL-DL interference) due to a difference in the transmission directions of the normal TTI and the shortened TTI can be avoided.

Figure 7:
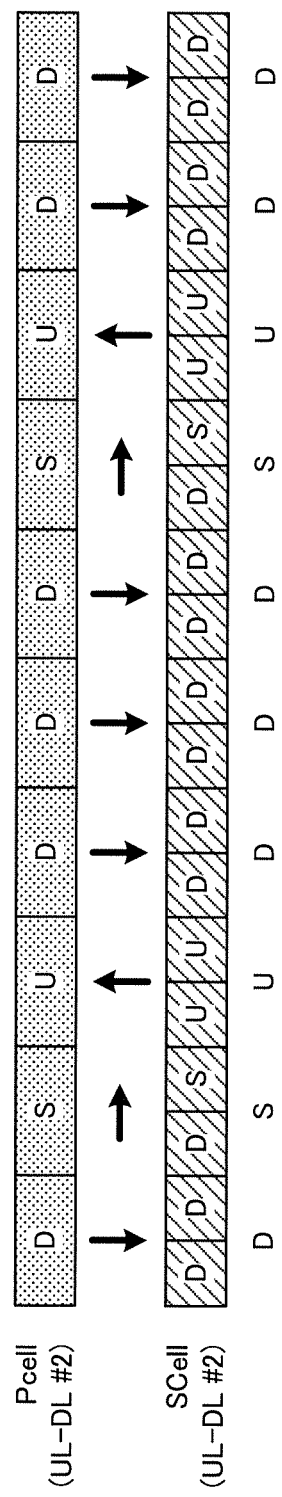
FIG. 7 is a diagram showing a configuration example of a UL-DL configuration for use in the shortened TTI according to the first embodiment.

FIG. 7 is a diagram showing a third configuration example of a shortened TTI UL-DL configuration. CA (TDD-TDD CA) (e.g., DL-CA) will be discussed, with reference to FIG. 7, for the case where TDD is used for both a CC of a normal TTI and a CC of a shortened TTI. As shown in FIG. 7, in the case where UL-DL configuration #2 is used in a Pcell for normal TTIs, a UL-DL configuration, in which the transmission directions for the shortened TTIs are determined so that the transmission directions of the normal TTIs and the shortened TTIs are the same, is used in an Scell for shortened TTIs.

As shown in FIG. 7, in the case where the shortened TTI UL-DL configuration is determined so that the transmission directions of the normal TTI and the shortened TTI are the same, a user terminal that carries out half-duplex communication (hereinafter, "half-duplex terminal") can also apply the above-described TDD-TDD CA that uses normal TTI CCs and shortened TTI CCs. Since a half-duplex terminal does not carry out transmission and reception simultaneously, it is possible to carry out TDD-TDD CA with the normal TTIs and the shortened TTIs while reducing the cost of the terminal.

In the above-described first aspect of the invention, the shortened TTI may be configured with the above-described first configuration example (FIG. 2A) or the second configuration example (FIG. 2B). Furthermore, in the first aspect of the invention, the configuration of the shortened TTI special subframe, described in FIG. 6, can of course be applied to FIGS. 5 and 7.

(Second Aspect)

In the second aspect of the invention, a description will be given in regard to a radio communication method that uses shortened TTIs in the DL. In the second aspect of the invention, a case is assumed in which DL signals in normal TTIs and shortened TTIs are multiplexed in the same CC. In the second aspect of the invention, it is preferable for the shortened TTIs to be configured by the above-described second configuration example (FIG. 2B). Furthermore, hereinbelow, the shortened TTIs in the DL are configured with OFDM symbols, however, the second aspect of the invention is not limited thereto.

<DL Signal Allocation Example>

Figure 8:
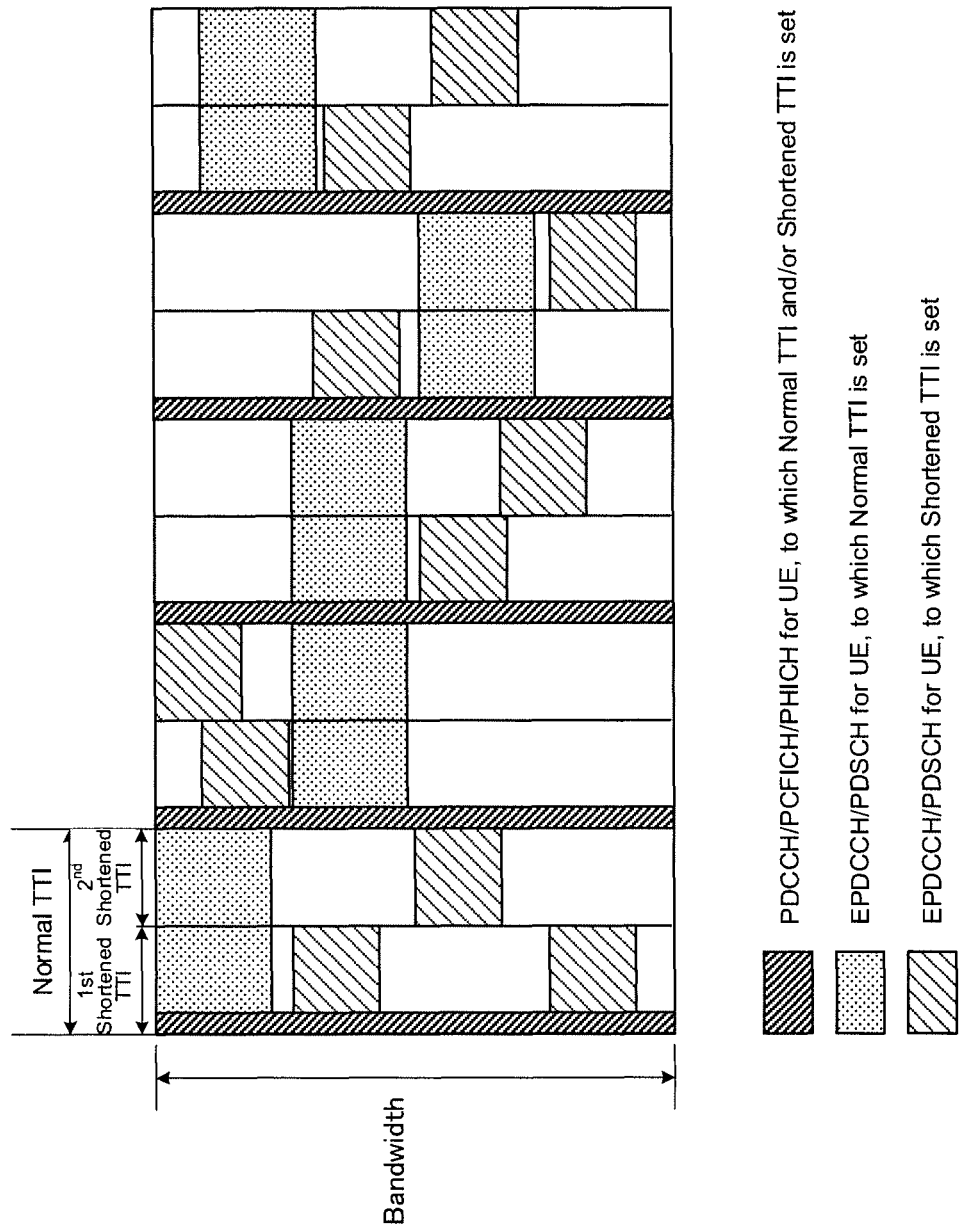
FIG. 8 is a diagram showing an example of allocation of DL signals using shortened TTI, according to the second embodiment.

FIG. 8 is a diagram showing an allocation example of DL signals in shortened TTIs. In FIG. 8, DL signals in normal TTIs are multiplexed with DL signals in shortened TTIs (e.g., Frequency Division Multiplexing (FDM)). Note that FIG. 8 shows an example in which the shortened TTI is 0.5 ms, and two shortened TTIs are provided within a normal TTI; however, the present invention is not limited thereto. Furthermore, the allocation of the DL signals shown in FIG. 8 is merely an example and is not limited thereto.

As shown in FIG. 8, L1/L2 control signals (e.g., at least one of a PDCCH, a PCFICH (Physical Control Format Indicator Channel) and a PHICH (Physical Hybrid-ARQ Indicator Channel)) are allocated (mapped) to a shortened TTI at locations corresponding to the $1^{st}$ through $3^{rd}$ symbols of each normal TTI (e.g., in FIG. 8, starting from the $1^{st}$ symbol of the normal TTI in a shortened TTI corresponding to a first-half slot of the normal TTI; hereinafter, "first shortened TTI"). Whereas, the L1/L2 control signals (e.g., at least one of a PDCCH, a PCFICH and a PHICH) are not allocated to a shortened TTI at locations that do not correspond to the $1^{st}$ through $3^{rd}$ symbols of each normal TTI (e.g., in FIG. 8, a shortened TTI corresponding to a second-half slot of the normal TTI; hereinafter, "second shortened TTI").

The PDCCH, PCFICH and/or PHICH are allocated over the entire CC frequency at the $1^{st}$ through $3^{rd}$ symbols of the normal TTI in order to obtain a frequency diversity effect. Accordingly, in the case where a PDCCH, PCFICH and/or PHICH are allocated to the second shortened TTI, the allocation of the PDSCH of the normal TTI would be restricted. Consequently, as shown in FIG. 8, by only allocating the PDCCH, PCFICH and/or PHICH to the first shortened TTI, normal TTIs and shortened TTIs can be made to coexist in a simple manner.

Note that the PCFICH is a physical channel for transmitting a CFI (Control Format Indicator) that indicates the number of symbols allocated to a PDCCH. Furthermore, the PHICH is a physical channel for transmitting delivery acknowledge information (HARQ-ACK) of an uplink shared channel (PUSCH: Physical Uplink Shared Channel).

Whereas, it is possible to allocate a downlink shared channel (PDSCH: Physical Downlink Shared Channel) and an enhanced downlink control channel (EPDCCH) to a shortened TTI corresponding to the $1^{st}$ through $3^{rd}$ symbols of the normal TTI (e.g., the first shortened TTI in FIG. 8) and/or a shortened TTI that does not correspond to the $1^{st}$ through $3^{rd}$ symbols of the normal TTI (e.g., the second shortened TTI in FIG. 8). As shown in FIG. 8, the PDSCH or EPDCCH of the shortened TTI is allocated to a frequency domain (PRB: Physical Resource Block) to which the PDSCH or EPDCCH of the normal TTI is not allocated.

As discussed above, an example is shown in FIG. 8 for the case where the shortened TTI is 0.5 ms, however, the radio communication method of the second aspect of the invention can be applicable in the case of the shortened TTI being other than 0.5 ms. For example, in the case where the shortened TTI is 0.2 ms, five shortened TTIs can be provided within a normal TTI. In such a case, the PDCCH, PCFICH and PHICH may be allocated to the first shortened TTI that corresponds to the $1^{st}$ through $3^{rd}$ symbols of the normal TTI and allocated to the $1^{st}$ symbol of the second shortened TTI, and the PDCCH, PCFICH and PHICH do not need to be allocated to the third through fifth shortened TTIs.

Furthermore, in the case where the shortened TTI is 0.1 ms, ten shortened TTIs can be provided within a normal TTI. In such a case, the PDCCH, PCFICH and PHICH may be allocated to the first through third shortened TTIs that correspond to the $1^{st}$ through $3^{rd}$ symbols of the normal TTI, and the PDCCH, PCFICH and PHICH do not need to be allocated to the fourth through tenth shortened TTIs.

<UE Operation when Receiving DL Signals>

Next an operation of a user terminal upon receiving a DL signal that is allocated in the above-described manner (e.g., an L1/L2 control signal (at least one of a PDCCH, PCFICH and PHICH), EPDCCH and/or PDSCH) will be described hereinbelow.

The user terminal trials a blind decoding of at least one of a PDCCH, PCFICH and PHICH in a shortened TTI corresponding to the $1^{st}$ through $3^{rd}$ symbols of the normal ITT (e.g., the first shortened TTI in FIG. 8), and a blind decoding does not need to be trialed in the shortened TTI that does not correspond to the $1^{st}$ through $3^{rd}$ symbols of the normal TTI (e.g., the second shortened TTI in FIG. 8). By omitting the blind decoding in the shortened TTI to which the PDCCH, PCFICH and/or PHICH are not allocated, power consumption of the user terminal can be reduced.

Furthermore, the user terminal may detect, in advance, whether the EPDCCH uses a normal TTI or a shortened TTI by notification information from a radio base station via higher layer signaling (e.g., RRC signaling), and carry out blind decoding on either of the EPDCCH for the normal TTI or the EPDCCH for the shortened TTI. Alternatively, the user terminal may carry out blind decoding on both of the EPDCCH for the normal TTI and the EPDCCH for the shortened TTI.

The control information payload of the EPDCCH for the normal TTI and the EPDCCH for the shortened TTI may be different; the mapping patterns on the physical resources of control signal elements (CCE) or enhanced control signal elements (ECCE) which configure a control signal (e.g., DCI format) may be different, or the RNTI values that are used when carrying out an error determination via a CRC, after decoding, may be different. Note that in such cases, the user terminal needs to carry out blind decoding on both the EPDCCH for the normal TTI and the EPDCCH for the shortened TTI.

Furthermore, the user terminal may detect, in advance, whether the PDSCH uses a normal TTI or a shortened TTI by notification information from a radio base station via higher layer signaling (e.g., RRC signaling), and carry out a PDSCH receiving process (e.g., demodulation or decoding, etc.).

Alternatively, a (DCI that is transmitted by a) PDCCH or EPDCCH for scheduling a PDSCH may designate whether the PDSCH uses a normal TTI or a shortened TTI. In such a case, the user terminal may detect whether the PDSCH uses a normal TTI or a shortened TTI via explicit instruction information included in the DCI. Alternatively, in the case where a specified modulation/encoding method (MCS: Modulation and Coding Scheme) or a specified PRB indexed is designated by the DCI, the user terminal may implicitly detect whether the PDSCH uses a normal TTI or a shortened TTI.

(Third Aspect)

In the third aspect, a description will be given in regard to a radio communication method that uses shortened TTIs in the UL. In the third aspect of the invention, a case is assumed in which UL signals in normal TTIs and shortened TTIs are multiplexed in the same CC. In the third aspect of the invention, it is preferable for the shortened TTIs to be configured by the above-described second configuration example (FIG. 2B). Furthermore, hereinbelow, the shortened TTIs in the UL are configured with SC-FDMA symbols, however, the third aspect of the invention is not limited thereto and may be configured with OFDM symbols.

<UL Signal Allocation Example>

Figure 9:
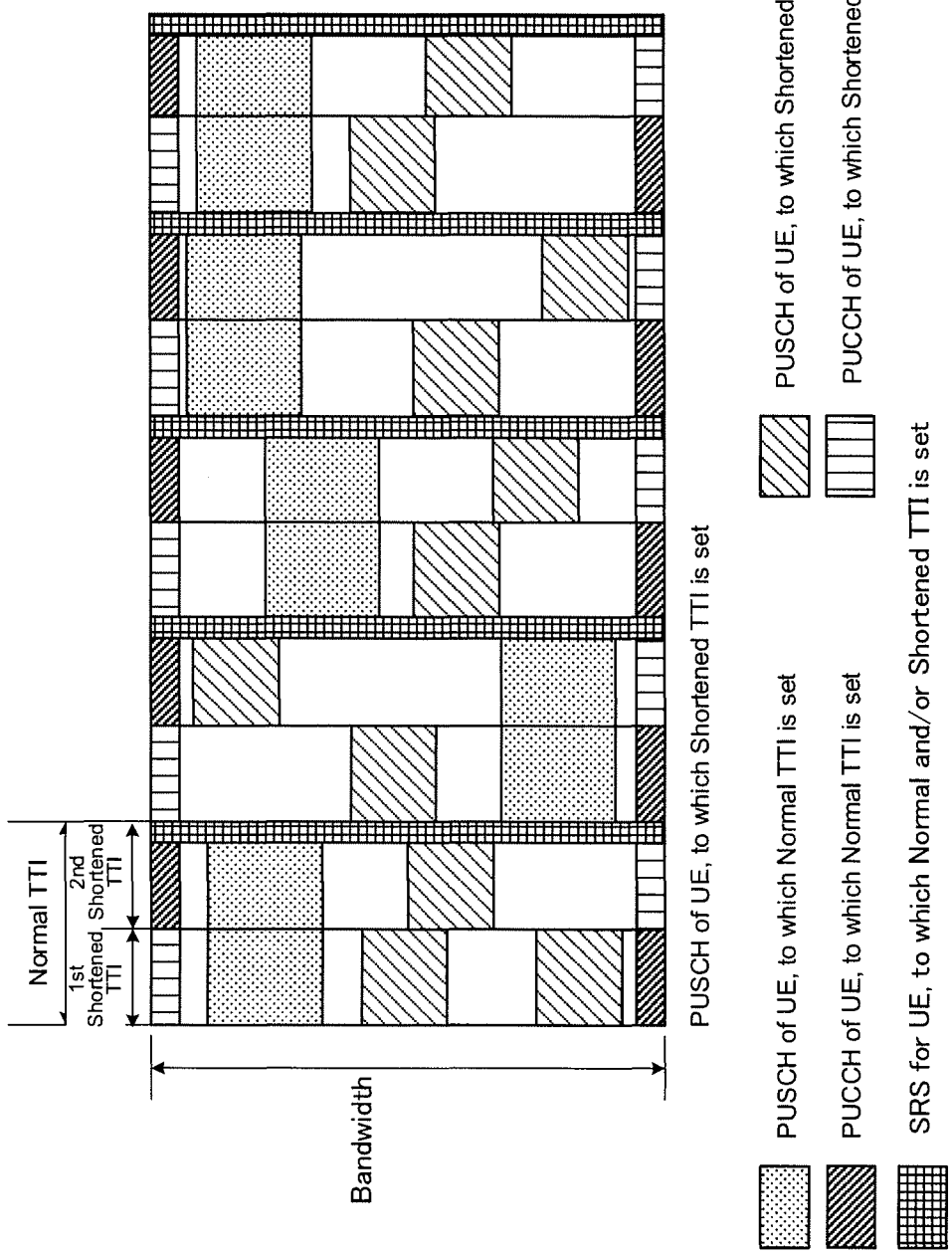
FIG. 9 is a diagram showing an example of allocation of DL signals using shortened TTI, according to the third embodiment.

FIG. 9 is a diagram showing an allocation example of UL signals in shortened TTIs. In FIG. 9, UL signals in normal TTIs are multiplexed with UL signals in shortened TTIs (e.g., Frequency Division Multiplexing (FDM)). Note that FIG. 9 shows an example in which the shortened TTI is 0.5 ms, and two shortened TTIs are provided within a normal TTI; however, the present invention is not limited thereto. Furthermore, the allocation of the UL signals shown in FIG. 9 is merely an example and is not limited thereto.

As shown in FIG. 9, an uplink shared channel (PUSCH: Physical Uplink Shared Channel) can be allocated to all of the shortened TTIs corresponding to a normal TTI (e.g., in FIG. 9, both of a first shortened TTI corresponding to a first-half slot of the normal TTI and a second shortened TTI corresponding to a second-half slot of the normal TTI). As shown in FIG. 9, the PUSCH of the shortened TTI is allocated (mapped) to a frequency domain (PRB: Physical Resource Block) to which the normal TTI PUSCH is not allocated.

Furthermore, an uplink control channel (PUCCH: Physical Uplink Control Channel) can be allocated to all of the shortened TTIs corresponding to a normal TTI (e.g., in FIG. 9, both of a first shortened TTI corresponding to a first-half slot of the normal TTI and a second shortened TTI corresponding to a second-half slot of the normal TTI). As shown in FIG. 9, the PUCCH of the normal TTI frequency hops to each end within the same CC between the first-half slot and the second-half slot. Accordingly, in FIG. 9, the PUCCH in the first shortened TTI is allocated in the same frequency domain (PRB) as that of the PUCCH in the second-half slot of the normal TTI, and the PUCCH in the second shortened TTI is allocated in the same PRB as that of the PUCCH in the first-half slot of the normal TTI.

Note that FIG. 9 is merely an example; the allocation of the PUCCH in the normal TTIs and in the shortened TTIs is not limited thereto. Furthermore, although in FIG. 9 frequency hopping of a shortened TTI PUCCH is not carried out, frequency hopping may alternatively be carried out.

Furthermore, an uplink propagation quality measurement reference signal (SRS: Sounding Reference Signal) is allocated at a shortened TTI that corresponds to the last symbol of each normal TTI (e.g., the second shortened TTI in FIG. 9). Whereas, the SRS is not allocated at a shortened TTI that does not correspond to a last symbol of a normal TTI (e.g., the first shortened TTI in FIG. 9); this is because the SRS is allocated over the entire frequency of the CC in the last symbol of each normal TTI.

As described above, an example is shown in FIG. 9 for the case where the shortened TTI is 0.5 ms, however, the radio communication method of the third aspect of the invention can be applicable in the case of the shortened TTI being other than 0.5 ms.

<UE Operation when Transmitting UL Signals>

Next an operation of a user terminal in the case of transmitting a UL signal (e.g., a PUSCH, PUCCH or SRS) that is allocated in the above-described manner will be described hereinbelow.

Furthermore, the user terminal may detect, in advance, whether the PUSCH uses a normal TTI or a shortened TTI by notification information from a radio base station via higher layer signaling (e.g., RRC signaling), and carry out a PUSCH transmitting process (e.g., demodulation or decoding, etc.).

Alternatively, a (DCI that is transmitted by a) PDCCH or EPDCCH for scheduling a PUSCH may designate whether the PUSCH uses a normal TTI or a shortened TTI. In such a case, the user terminal may detect whether the PUSCH uses a normal TTI or a shortened TTI via explicit instruction information included in the DCI. Alternatively, in the case where a specified modulation/encoding method (MCS) or a specified PRB indexed is designated by the DCI, the user terminal may implicitly detect whether the PUSCH uses a normal TTI or a shortened TTI.

Furthermore, the user terminal may set shortened TTIs for the PUSCH and set normal TTIs for the PUCCH. As shown in FIG. 9, in the case of a PUCCH in the normal TTI, a 1 ms radio resource that is sufficient for uplink control information (UCI) is allocated, and furthermore, coverage can be maintained since frequency hopping can be applied. Furthermore, in the case where a normal TTI is used for the PUCCH, it is possible to carry out frequency multiplexing in a user terminal to which shortened TTIs are set and in a user terminal to which shortened TTIs are not set (i.e., a user terminal in which only normal TTIs can be utilized).

Furthermore, in the case where the PUSCH and PUCCH collide, and the UCI is transmitted on the PUSCH (UCI on PUSCH), if the user terminal has a shortened TTI set for PUSCH usage, the UCI may be transmitted (piggybacked) on the PUSCH of the shortened TTI. In such a case, since the user terminal uniquely transmits the PUSCH by shortened TTIs (does not transmit by normal TTIs), the radio base station can omit the blind decoding of normal TTIs. Note that in such a case, how to piggyback the UCI onto the PUSCH that is transmitted by shortened TTIs becomes a problem. For example, the UCI can be mapped to a periphery of a reference signal (DMRS) that is included in the PUSCH of the shortened TTIs, and rate-matching or puncturing can be carried out at a corresponding amount of UL-SCH included in the PUSCH.

Alternatively, in the case of UCI on PUSCH, the user terminal may fall back on using a normal TTI for the PUSCH even if shortened TTIs are set for PUSCH usage, and transmit (piggyback) the UCI on the PUSCH using normal TTIs. In such a case, since the user terminal switches between shortened TTIs and normal TTIs in accordance with whether or not a PDSCH (DL grant) has been allocated, in preparation for both the case in which the user terminal could correctly detect a DL grant and the case in which the user terminal could not detect a DL grant, the radio base station carries out blind decoding assuming a PUSCH using shortened TTIs and a PUSCH using normal TTIs, whereby the PUSCH can be correctly detected. Whereas, since an UCI can be transmitted via normal TTIs, coverage can be easily maintained due to being able to utilize an existing LTE system.

Furthermore, the user terminal transmits the SRS at the last symbol of each normal TTI or at the last symbol of a shortened TTI (e.g., the second shortened TTI in FIG. 9) that corresponds to the last symbol of each normal TTI.

(Radio Communication System)

The following description concerns the configuration of a radio communication system according to an embodiment of the present invention. In this radio communication system, a radio communication method is adopted to which the above-described examples are applied. Furthermore, each radio communication method can be applied independently, or in combination.

Figure 10:
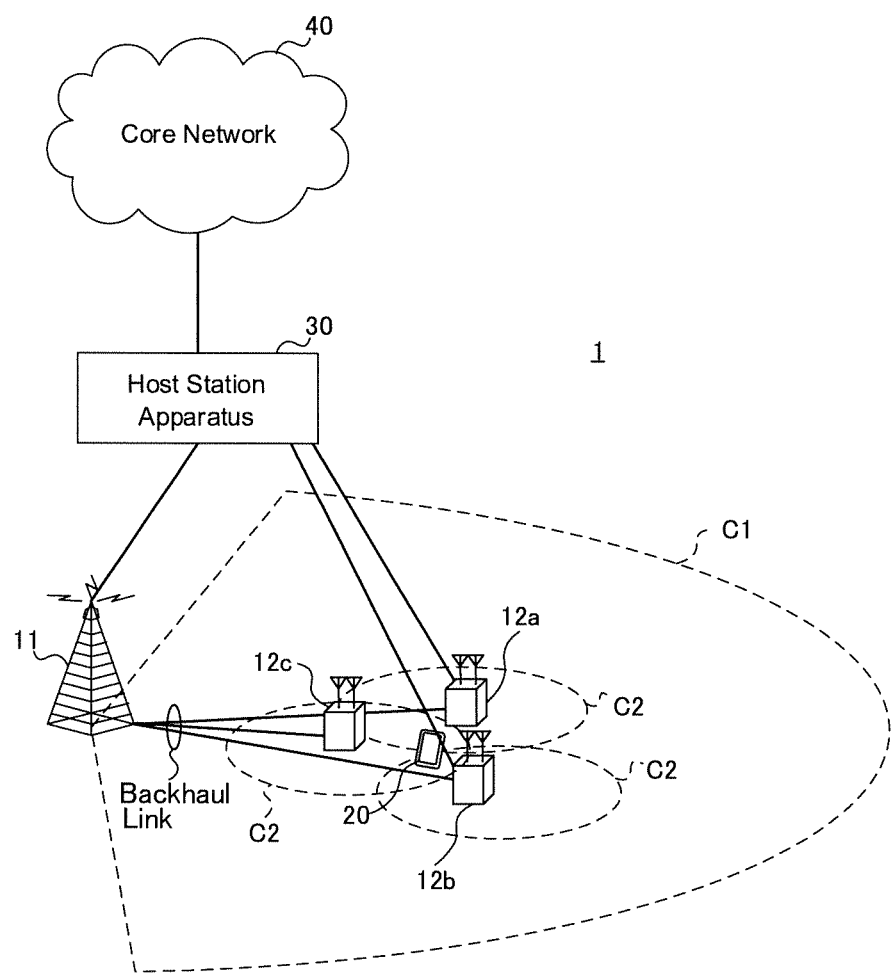
FIG. 10 is an illustrative diagram of a schematic configuration of a radio communication system of according to an illustrated embodiment of the present invention.

FIG. 10 shows an example of a schematic configuration of the radio communication system according to an embodiment of the present invention. The radio communication system 1 can apply carrier aggregation (CA) and/or dual connectivity (DC), which are an integration of a plurality of fundamental frequency blocks (component carriers), having the system bandwidth (e.g., 20 MHz) as 1 unit. Note that this radio communication system may also be called SUPER 3G, LTE-A (LTE-Advanced), IMT-Advanced, 4G, 5G, or FRA (Future Radio Access), etc.

The radio communication system 1 shown in FIG. 10 includes a radio base station 11 which forms a macro cell C1, and radio base stations 12a through 12c provided within the macro cell C1 and forming a small cell C2 that is smaller than the macro cell C1. Furthermore, a user terminal 20 is provided within the macro cell C1 and each small cell C2.

The user terminal 20 can connect both to the radio base station 11 and the radio base station 12. It is assumed that the user terminal 20 concurrently uses the macro cell C1 and the small cell C2 that use different frequencies via CA or DC. Furthermore, the user terminal 20 can apply CA or DC using a plurality of cells (CCs) (e.g., six or more CCs).

Communication between the user terminal 20 and the radio base station 11 can be carried out using a carrier (called an "existing carrier", "Legacy carrier", etc.) having a narrow bandwidth in a relatively low frequency band (e.g., 2 GHz). Whereas, communication between the user terminal 20 and the radio base station 12 may be carried out using a carrier having a wide bandwidth in a relative high frequency band (e.g., 3.5 GHz, 5 GHz, etc.), or using the same carrier as that with the radio base station 11. Note that the configuration of the frequency used by the radio base stations is not limited to the above.

A fixed-line connection (e.g., optical fiber, or X2 interface, etc., compliant with CPRI (Common Public Radio Interface)) or a wireless connection can be configured between the radio base station 11 and the radio base station 12 (or between two radio base stations 12).

The radio base station 11 and each radio base station 12 are connected to a host station apparatus 30, and are connected to the core network 40 via the host station apparatus 30. The host station apparatus 30 includes, but is not limited to, an access gateway apparatus, a radio network controller (RNC), and a mobility management entity (MME), etc. Furthermore, each radio base station 12 may be connected to the host station apparatus 30 via the radio base station 11.

Note that the radio base station 11 is a radio base station having a relatively wide coverage, and may be called a macro base station, an aggregation node, eNB (eNodeB) or a transmission/reception point. Furthermore, the radio base station 12 is a radio base station having local coverage, and may be called a small base station, a micro base station, a pico base station, a femto base station, HeNB (Home eNodeB), RRH (Remote Radio Head), or a transmission/reception point, etc. Hereinafter, the radio base stations 11 and 12 will be generally referred to as "a radio base station 10" in the case where they are not distinguished.

Each user terminal 20 is compatible with each kind of communication scheme such as LTE, LTE-A, etc., and also includes a fixed communication terminal in addition to a mobile communication terminal.

In the radio communication system 1, OFDMA (Orthogonal Frequency Division Multiple Access) is applied to the downlink and SC-FDMA (Single-Carrier Frequency Division Multiple Access) is applied to the uplink as radio access schemes. OFDMA is a multi-carrier transmission scheme for performing communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. Note that the uplink and downlink radio access schemes are not limited to these combinations; an OFDMA may be used for the uplink.

In the radio communication system 1, a downlink shared channel (PDSCH: Physical Downlink Shared Channel) that is shared by each user terminal 20, a broadcast channel (PBCH: Physical Broadcast channel), and an L1/L2 control channel, etc., are used as downlink channels. User data and higher layer control information, and an SIB (System Information Block) are transmitted on the PDSCH. Furthermore, an MIB (Master Information Block), etc., is transmitted on the PBCH.

The downlink L1/L2 control channel includes a downlink control channel (PDCCH (Physical Downlink Control Channel), an EPDCCH (Enhanced Physical Downlink Control Channel)), a PCFICH (Physical Control Format Indicator Channel), and a PHICH (Physical Hybrid-ARQ Indicator Channel), etc. Downlink control information (DCI), etc., which includes PDSCH and PUSCH scheduling information, is transmitted by the PDCCH. The number of OFDM symbols used in the PDCCH is transmitted by the PCFICH. A HARQ delivery acknowledgement signal (ACK/NACK) for the PUSCH is transmitted by the PHICH. An EPDCCH that is frequency-division-multiplexed with a PDSCH (downlink shared data channel) can be used for transmitting the DCI in the same manner as the PDCCH.

In the radio communication system 1, an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc., are used as uplink channels. The PUSCH is used to transmit user data and higher layer control information. Uplink control information (UCI) including at least one of delivery acknowledgement information (HARQ-ACK) and radio quality information (CQI), etc., is transmitted via the PUSCH or the PUCCH. A random access preamble for establishing a connection with a cell is transmitted by the PRACH.

<Radio Base Station>

Figure 11:
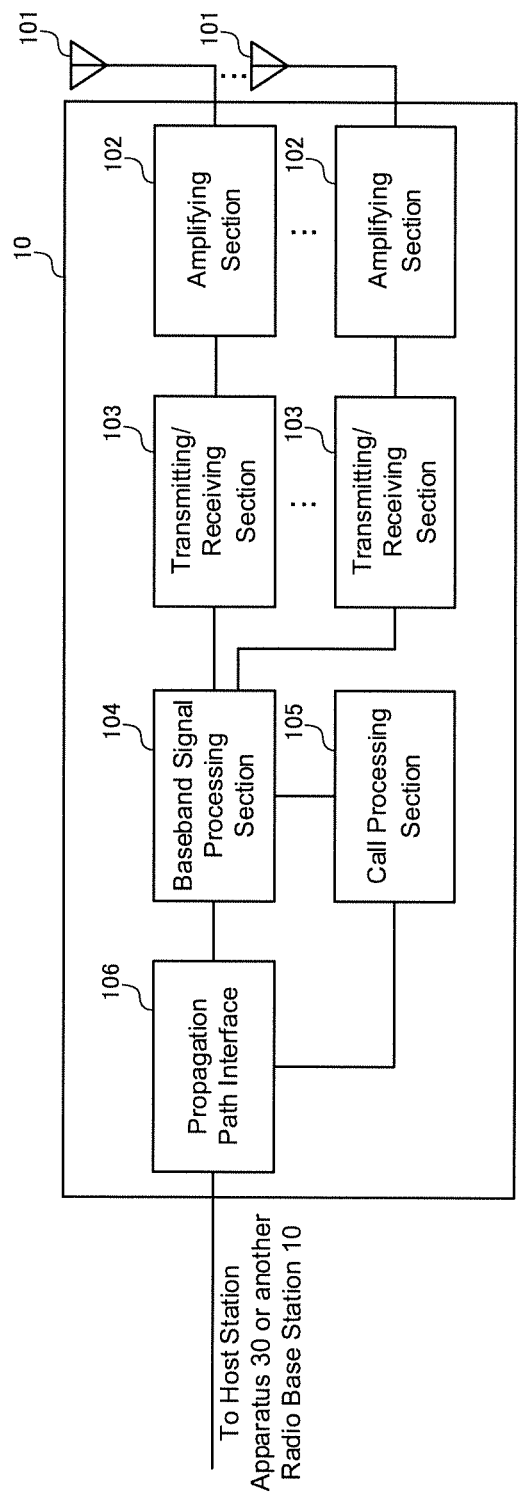
FIG. 11 is an illustrative diagram showing an overall configuration of a radio base station according to the illustrated embodiment of the present invention.

FIG. 11 is a diagram illustrating an overall configuration of the radio base station according to the embodiment of the present invention. The radio base station 10 is configured of a plurality of transmission/reception antennas 101, amplifying sections 102, transmitting/receiving sections 103, a baseband signal processing section 104, a call processing section 105 and a transmission path interface 106. Note that the transmission/reception antennas 101, the amplifying sections 102 and the transmitting/receiving sections 103 may be respectively configured as more than one thereof.

User data that is to be transmitted on the downlink from the radio base station 10 to the user terminal 20 is input from the host station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmitting/receiving section 103 converts the baseband signals, output from the baseband signal processing section 104 after being precoded per each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101.

Based on common recognition in the field of the art pertaining to the present invention, each transmitting/receiving section 103 can be configured as a transmitter/receiver, a transmitter/receiver circuit or a transmitter/receiver device. Note that each transmitting/receiving section 103 may be configured as an integral transmitting/receiving section or may be configured as a transmitting section and a receiving section.

Whereas, in regard to the uplink signals, radio frequency signals received by each transmission/reception antenna 101 are amplified by each amplifying section 102. The transmitting/receiving sections 103 receive the uplink signals that are amplified by the amplifying sections 102, respectively. The transmitting/receiving sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the host station apparatus 30 via the transmission path interface 106. The call processing section 105 performs call processing such as releasing a communication channel, manages the state of the radio base station 10, and manages the radio resources.

The transmission path interface 106 performs transmission and reception of signals with the host station apparatus 30 via a predetermined interface. Furthermore, the transmission path interface 106 can perform transmission and reception of signals (backhaul signaling) with a neighboring radio base station 10 via an inter-base-station interface (for example, optical fiber or X2 interface compliant with CPRI (Common Public Radio Interface)).

Figure 12:
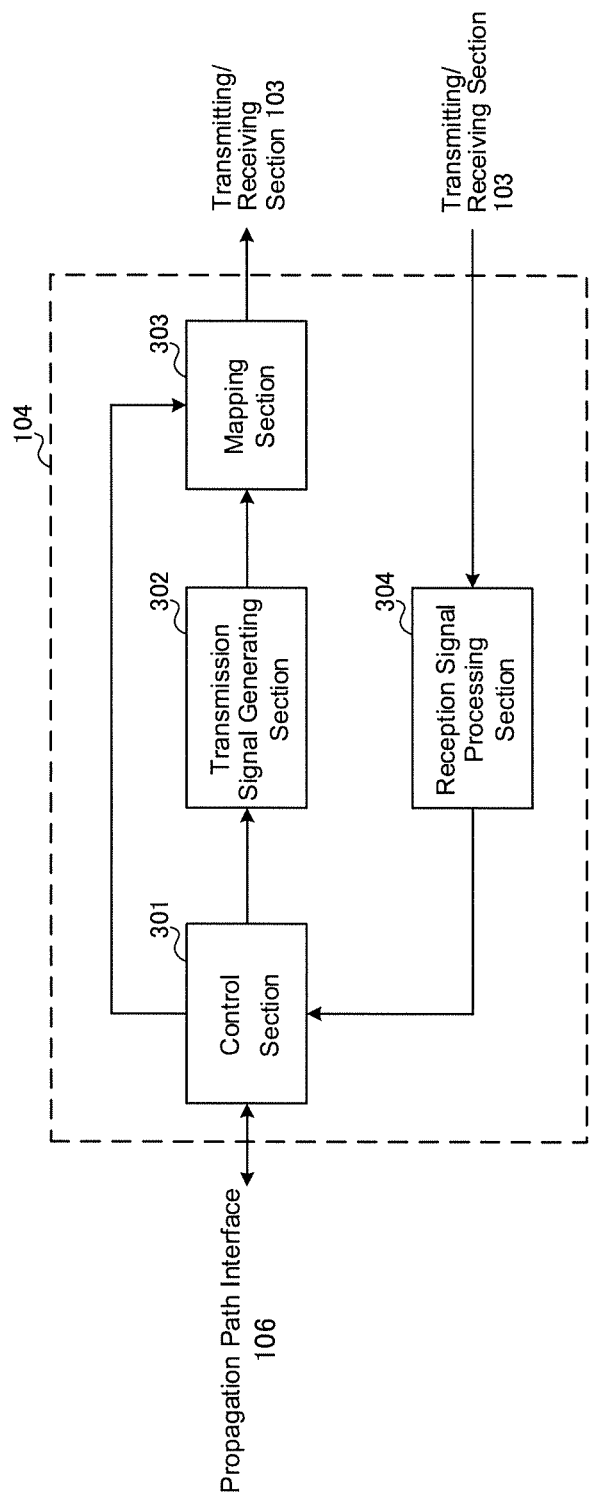
FIG. 12 is an illustrative diagram of a functional configuration of the radio base station according to the illustrated embodiment of the present invention.

FIG. 12 is a diagram illustrating the functional configurations of the radio base station according to the present embodiment. Note that although FIG. 12 mainly shows functional blocks of the features of the present embodiment, the radio base station 10 is also provided with other functional blocks that are necessary for carrying out radio communication. As illustrated in FIG. 12, the baseband signal processing section 104 includes a control section 301, a transmission signal generating section 302, a mapping section 303, and a reception signal processing section 304.

The control section 301 carries out the overall control of the radio base station 10. The control section 301 controls, e.g., the generation of downlink signals by the transmission signal generating section 302, the mapping of signals by the mapping section 303, and the control of reception processes by the reception signal processing section 304.

Specifically, the control section 301 carries out transmission control (e.g., control of modulation scheme, coding rate, resource allocation (scheduling), etc.) of downlink (DL) signals based on channel state information (CSI) reported from the user terminal 20.

Furthermore, the control section 301 controls the carrier aggregation (CA) of the user terminal 20. Specifically, the control section 301 may determine the application of CA/change in number of CCs, etc., based on the CSI, etc., reported from the user terminal 20, and control the transmission signal generating section 302 to generate information that indicates such an application/change. Note that the information that indicates such an application/change may be included in higher layer signaling control information.

Furthermore, the control section 301 controls the transmission time interval (TTI) used in the reception of the DL signals and/or the transmission of the UL signals. Specifically, the control section 301 sets the 1 ms normal TTI and/or the shortened TTI that is shorter than the normal TTI. Configuration examples and setting examples of the shortened TTI are as shown in FIGS. 2 and 3. The control section 301 can provide a command to the user terminal 20 for a shortened TTI setting by (1) an implicit notification, or an explicit notification by at least one of (2) RRC signaling, (3) MAC signaling and (4) PHY signaling.

In the first aspect of the invention, the control section 301 carries out a control of the TDD UL-DL configuration. Specifically, the control section 301 may determine the UL-DL configuration for shortened TTIs, and notify the user terminal 20 accordingly by at least one of RRC signaling, MAC signaling and PHY signaling. Furthermore, the control section 301 may determine the UL-DL configuration for normal TTIs, and notify the user terminal 20 accordingly by SIB1 or RRC signaling. In such a case, transmission signals that indicate the shortened TTI and/or normal TTI UL-DL configurations are generated by the transmission signal generating section 302, are mapped to radio resources by the mapping section 303, and are transmitted via the transmitting/receiving sections 103. The shortened TTI UL-DL configurations are as shown in FIGS. 5 through 7.

In the second aspect of the invention, the control section 301 controls the allocation (mapping) of DL signals to shortened TTIs and/or normal TTIs. Specifically, the control section 301 may control the mapping section 303 to allocate at least one of a PDCCH, PCFICH and PHICH to a shortened TTI (e.g., the first shortened TTI of FIG. 8) corresponding to the $1^{st}$ through $3^{rd}$ symbols of the normal TTI. Whereas, the control section 301 may control the mapping section 303 so as not to allocate at least one of a PDCCH, PCFICH and PHICH to a shortened TTI (e.g., the second shortened TTI of FIG. 8) that does not correspond to the $1^{st}$ through $3^{rd}$ symbols of the normal TTI.

Furthermore, in the second aspect of the invention, the control section 301 controls the mapping section 303 to allocate the PDSCH and EPDCCH to a shortened TTI (e.g., the first shortened TTI of FIG. 8) corresponding to the $1^{st}$ through $3^{rd}$ symbols of the normal TTI and/or a shortened TTI (e.g., the second shortened TTI of FIG. 8) that does not correspond to the $1^{st}$ through $3^{rd}$ symbols of the normal TTI. Accordingly, it is possible to also allocate a PDSCH and an EPDCCH to the second shortened TTI of FIG. 8.

In the third aspect of the invention, the control section 301 controls the allocation (mapping) of UL signals in the shortened TTIs and/or normal TTIs. Specifically, the control section 301 may control the transmission signal generating section 302 to generate allocation information (UL grant) for allocating a PUSCH and/or PUCCH at one out of all of the shortened TTIs (e.g., the first and second shortened TTIs in FIG. 9) that correspond to a normal TTI. This allocation information is transmitted to the user terminal 20 via a PDCCH/EPDCCH.

Based on common recognition in the field of the art pertaining to the present invention, the control section 301 can be configured as a controller, a control circuit or a control device.

The transmission signal generating section 302 generates a DL signal (including downlink data signals and downlink control signal) based on instructions from the control section 301, and outputs the generated signal to the mapping section 303. Specifically, the transmission signal generating section 302 generates a downlink data signal (PDSCH) including the above-mentioned notification information (control information) via higher layer signaling and user data, and outputs the downlink data signal to the mapping section 303. Furthermore, the transmission signal generating section 302 generates a downlink control signal (PDCCH/EPDCCH) including a DCI, and is output to the mapping section 303. Furthermore, the transmission signal generating section 302 generates a downlink reference signal, such as a CRS, or a CSI-RS, etc., and outputs this signal to the mapping section 303.

Based on common recognition in the field of the art pertaining to the present invention, the downlink control signal generating section 302 can be configured as a signal generator or a signal generating circuit.

Based on instructions from the control section 301, the mapping section 303 maps the DL signal generated in the transmission signal generating section 302 to predetermined radio resources to output to the transmitting/receiving sections 103. Based on common recognition in the field of the art pertaining to the present invention, the mapping section 303 can be configured as a mapping circuit and a mapper.

The reception signal processing section 304 performs a receiving process (e.g., demapping, demodulation, and decoding, etc.) on the UL signal transmitted from the user terminal 20. The result of this process is output to the control section 301.

Based on common recognition in the field of the art pertaining to the present invention, the reception signal processing section 304 can be configured as a signal processor, a signal processing circuit, or a signal processing device; or can be configured as a measurer, a measuring circuit or a measuring device.

<User Terminal>

Figure 13:
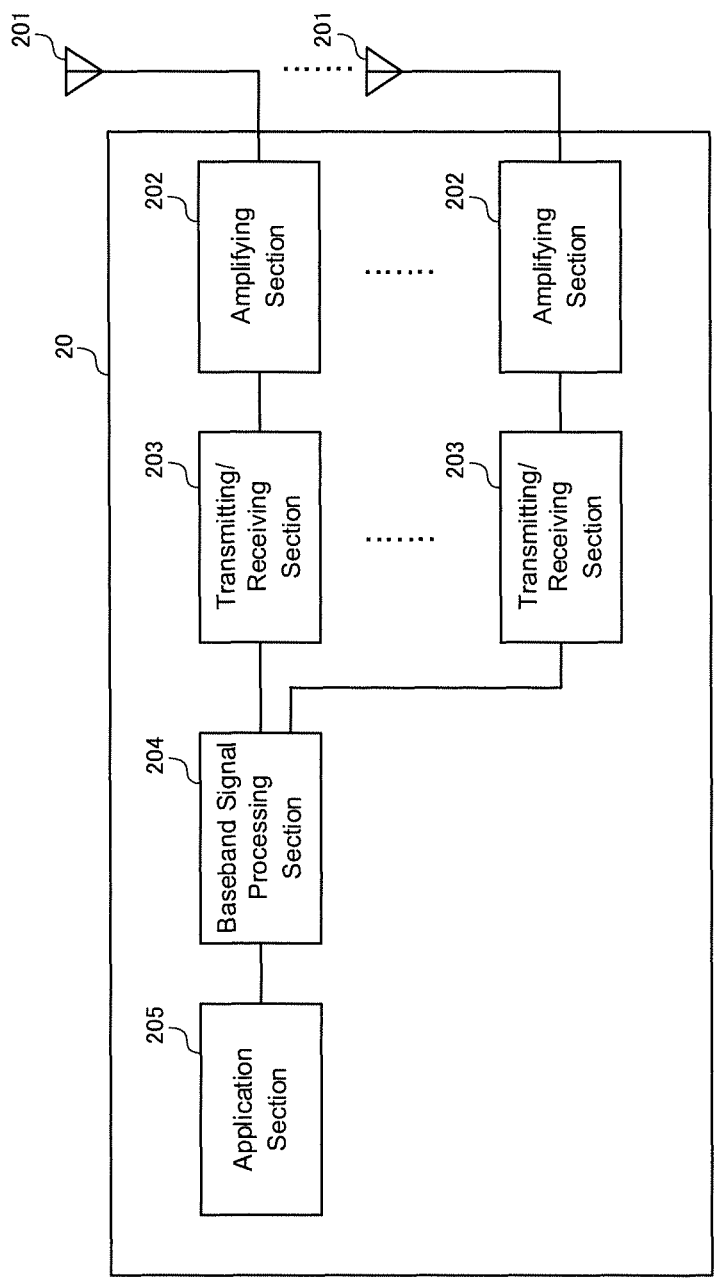
FIG. 13 is an illustrative diagram showing an overall configuration of a user terminal according to the illustrated embodiment of the present invention.

FIG. 13 is a diagram showing an overall structure of a user terminal according to the present embodiment. The user terminal 20 is provided with a plurality of transmitting/receiving antennas 201 for MIMO communication, amplifying sections 202, transmitting/receiving sections 203, a baseband signal processing section 204 and an application section 205.

Radio frequency signals that are received in the plurality of transmitting/receiving antennas 201 are respectively amplified in the amplifying sections 202. Each transmitting/receiving section 203 receives a downlink signal that has been amplified by an associated amplifying section 202. The transmitting/receiving sections 203 perform frequency conversion on the reception signals to convert into baseband signals, and are thereafter output to the baseband signal processing section 204.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmitting/receiving sections 203. Thereafter, the amplifying sections 202 amplify the radio frequency signal having been subjected to frequency conversion, and transmit the resulting signal from the transmitting/receiving antennas 201.

Based on common recognition in the field of the art pertaining to the present invention, each transmitting/receiving section 203 can be configured as a transmitter/receiver, a transmitter/receiver circuit or a transmitter/receiver device.

Figure 14:
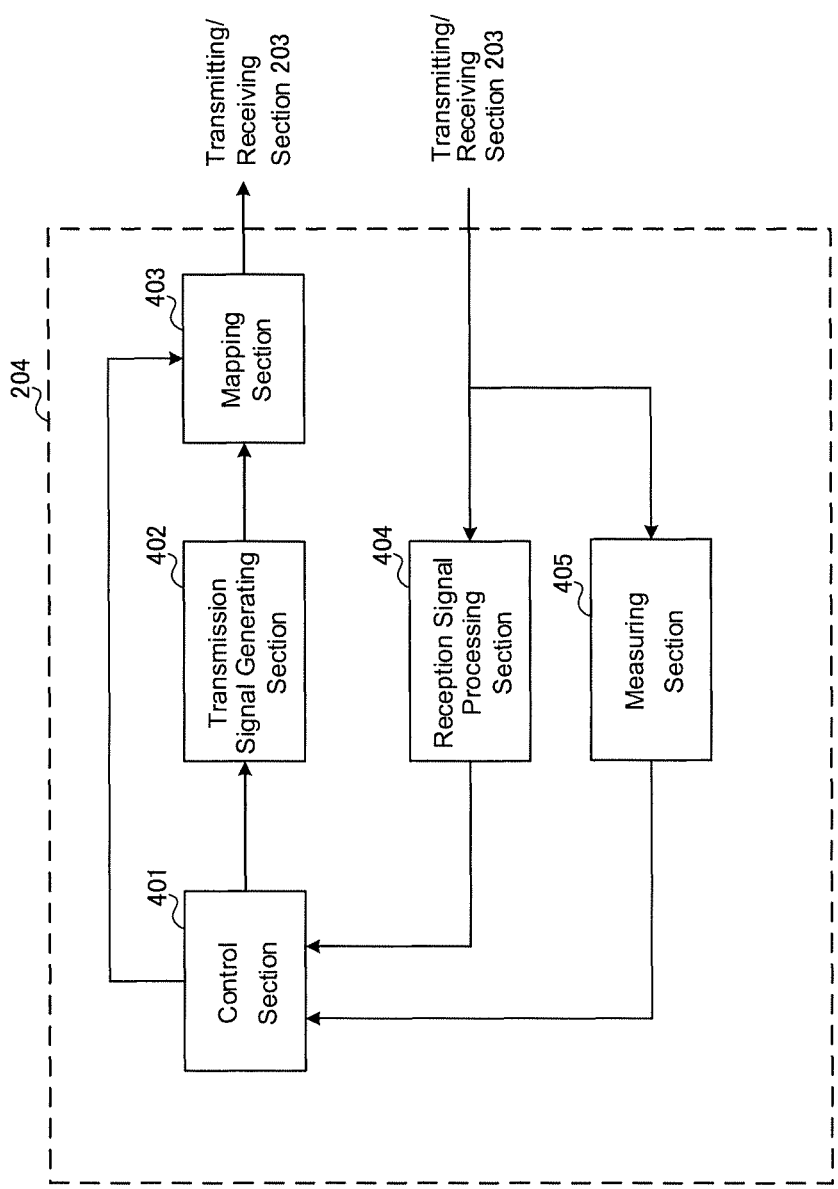
FIG. 14 is an illustrative diagram showing a functional configuration of the user terminal according to the illustrated embodiment of the present invention.

FIG. 14 is a diagram illustrating the functional configurations of the user terminal according to the present embodiment. Note that FIG. 14 mainly shows functional blocks of the features of the present embodiment; the user terminal 20 is also provided with other functional blocks that are necessary for carrying out radio communication. As illustrated in FIG. 14, the baseband signal processing section 204 provided in the user terminal 20 includes a control section 401, a transmission signal generating section 402, a mapping section 403, a reception signal processing section 404, and a measuring section 405.

The control section 401 carries out the overall control of the user terminal 20. The control section 401 controls, e.g., the generation of signals by the transmitting section 402, the mapping of signals by the mapping section 403, and the control of reception processes on signals by the reception signal processing section 404.

Furthermore, the control section 401 controls the transmission time interval (TTI) used in the reception of downlink (DL) signals and/or the transmission of uplink (UL) signals. Specifically, the control section 401 sets the 1 ms normal TTI and/or the shortened TTI that is shorter than the normal TTI. Configuration examples and setting examples of the shortened TTI are as shown in FIGS. 2 and 3. The control section 401 may detect a shortened TTI setting by from the radio base station 10 (1) an implicit notification, or an explicit notification by at least one of (2) RRC signaling, (3) MAC signaling and (4) PHY signaling.

In the first aspect of the invention, the control section 401 carries out a control of the TDD UL-DL configuration. Specifically, the control section 401 may determine the UL-DL configuration for shortened TTIs notified from the radio base station 10 by at least one of RRC signaling, MAC signaling and PHY signaling. Alternatively, the user terminal may determine the UL-DL configuration for shortened TTIs based on the UL-DL configuration for normal TTIs notified from the radio base station 10 by SIB1 or RRC signaling. The shortened TTI UL-DL configurations are as shown in FIGS. 5 through 7.

In the second aspect of the invention, the control section 401 controls the reception processes (e.g., decoding, demodulation, etc.) of DL signals. Specifically, the control section 401 may carry out blind decoding on at least one of a PDCCH, PCFICH and PHICH at a shortened TTI (e.g., the first shortened TTI of FIG. 8) corresponding to the $1^{st}$ through $3^{rd}$ symbols of the normal TTI. The control section 401 does not need to carry out blind decoding on at least one of a PDCCH, PCFICH and PHICH at a shortened TTI (e.g., the second shortened TTI of FIG. 8) that does not correspond to the $1^{st}$ through $3^{rd}$ symbols of the normal TTI.

Furthermore, in the second aspect of the invention, the control section 401 may carry out blind decoding on either the EPDCCH for normal TTIs or the EPDCCH for shortened TTIs based on notification information via higher layer signaling. Alternatively, the control section 401 carry out blind decoding on both the EPDCCH for normal TTIs and the EPDCCH for shortened TTIs.

Furthermore, in the second aspect of the invention, the control section 401 may detect either a PDSCH for normal TTIs or a PDSCH for shortened TTIs based on notification information via higher layer signaling or downlink control information (DCI).

In the third aspect of the invention, the control section 401 controls transmission processes of the UL signals (e.g., decoding, demodulation, etc.). Specifically, the control section 401 may detect either the PUSCH for normal TTIs or the PUSCH for shortened TTIs based on notification information via higher layer signaling or downlink control information (DCI)

Furthermore, in the third aspect of the invention, the control section 401 may set shortened TTIs for PUSCH usage and set normal TTIs for PUCCH usage. Furthermore, in the case where shortened TTIs are set for PUSCH usage when a UCI is transmitted by the PUSCH, the control section 401 perform a control to transmit the UCI on the shortened TTI PUSCH, or may perform a control to fall back to the normal TTI PUSCH and transmit the UCI on the normal TTI PUSCH.

Furthermore, in the third aspect of the invention, the control section 401 may transmit the SRS at the last symbol of each normal TTI or at the last symbol of a shortened TTI (e.g., the second shortened TTI in FIG. 9) that corresponds to the last symbol of each normal TTI.

Based on common recognition in the field of the art pertaining to the present invention, the control section 401 can be configured as a controller, a control circuit or a control device.

The transmission signal generating section 402 generates an UL signal (including an uplink data signal and an uplink control signal) based on instructions from the control section 401 and outputs the UL signal to the mapping section 403. For example, the transmission signal generating section 402 generates an uplink control signal (PUCCH) including a UCI (at least one of an HARQ-ACK, CQI and SR).

Based on common recognition in the field of the art pertaining to the present invention, the transmission signal generating section 402 can correspond to a signal generator, a signal generating circuit, or a signal generating device.

The mapping section 403 maps the UL signal (uplink control signal and/or uplink data signal) generated by the transmission signal generating section 402, based on instructions from the control section 401, to radio resources and outputs the generated signal to the transmitting/receiving sections 203. Based on common recognition in the field of the art pertaining to the present invention, the mapping section 403 can correspond to a mapper, a mapping circuit or a mapping device.

The reception signal processing section 404 performs reception processing (e.g., demapping, demodulation, decoding, etc.) on the DL signal (including a downlink control signal and a downlink data signal). The reception signal processing section 404 outputs the information received from the radio base station 10 to the control section 401. For example, the reception signal processing section 404 outputs control information via higher layer signaling such as broadcast information, system information, RRC signaling, etc., and a DCI, etc., to the control section 401.

Based on common recognition in the field of the art pertaining to the present invention, the reception signal processing section 404 can be configured as a signal processor, a signal processing circuit, or a signal processing device. Furthermore, the reception signal processing section 404 can be configured as a receiving section pertaining to the present invention.

The measuring section 405 measures the channel state based on a reference signal (e.g., a CSI-RS) from the radio base station 10 and outputs the measurement result to the control section 401. Note that the channel state can be measured per each CC.

Based on common recognition in the field of the art pertaining to the present invention, the measuring section 405 can be configured as a signal processor, a signal processing circuit or a signal processing device; and also as a measurer, a measuring circuit or a measuring device.

Furthermore, the block diagrams used in the above description of the present embodiment indicate function-based blocks. These functional blocks (configured sections) are implemented via a combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio communication system and the user terminal, etc., pertaining to the embodiment of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, ROM (Read Only Memory), EPROM (Erasable Programmable ROM), CD-ROM (Compact Disc-ROM), RAM (Random Access Memory), or a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads a programs, software modules and data from the storage medium into a memory, and performs the various processes thereof accordingly.

The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example channel and/or symbol may be signals (signaling). Furthermore, a signal may be a message. Furthermore, component carrier (CC) may be called a carrier frequency or cell, etc.

Furthermore, information and parameters, etc., discussed in the present specification may be expressed as absolute values, or as a relative value with respect to a predetermined value, or expressed as other corresponding information. For example, a radio resource may be indicated as an index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/embodiments of the present invention, such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block))), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc.

The above-described aspects/embodiments of the present invention may be applied to a system that utilizes LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long no contradictions occur. For example, each method described in the present specification proposes an example of an order of various steps but are not limited to the specified order thereof.

Hereinabove, the present invention has been described in detail by use of the foregoing embodiments. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

The disclosure of Japanese Patent Application No. 2015-143157, filed on Jul. 17, 2015, the content of which being incorporated herein by reference in its entirety.

The invention claimed is:

1. A terminal comprising:
   a receiver that receives a downlink signal;
   a transmitter that transmits an uplink signal; and
   a processor that controls a period used in reception of the downlink signal and/or used in transmission of the uplink signal,
   wherein the processor configures a second period that is shorter than a first period, the first period comprising 14 symbols, and the second period comprising 14 symbols, each symbol in the second period being shorter than each symbol in the first period,
   in the case where the second period is used in time division duplex (TDD), the processor aligns a transmission direction in the second period with a transmission direction in the first period based on an uplink-downlink configuration for the first period, and
   in the case where the uplink-downlink configuration indicate an uplink symbol and a downlink symbol in the first period, the processor aligns transmission directions of symbols in the second period corresponding to the uplink symbol and the downlink symbol with transmission directions of the uplink symbol and the downlink symbol.

2. The terminal according to claim 1, wherein a subcarrier spacing of the second period is larger than a subcarrier spacing of the first period.

3. A base station comprising:
   a transmitter that transmits a downlink signal;
   a receiver that receives an uplink signal; and
   a processor that controls a period used in transmission of the downlink signal and/or used in reception of the uplink signal,
   wherein the processor configures a second period that is shorter than a first period, the first period comprising 14 symbols, and the second period comprising 14 symbols, each symbol in the second period being shorter than each symbol in the first period,
   in the case where the second period is used in time division duplex (TDD), the processor aligns a transmission direction in the second period with a transmission direction in the first period based on an uplink-downlink configuration for the first period, and
   in the case where the uplink-downlink configuration indicate an uplink symbol and a downlink symbol in the first period, the processor aligns transmission directions of symbols in the second period corresponding to the uplink symbol and the downlink symbol with transmission directions of the uplink symbol and the downlink symbol.

4. A radio control method for a terminal comprising:
   receiving a downlink signal;
   transmitting an uplink signal; and
   controlling a period used in reception of the downlink signal and/or used in transmission of the uplink signal,
   wherein the terminal configures a second period that is shorter than a first period, the first period comprising 14 symbols, and the second period comprising 14 symbols, each symbol in the second period being shorter than each symbol in the first period,
   in the case where the second period is used in time division duplex (TDD), the terminal aligns a transmission direction in the second period with a transmission direction in the first period based on an uplink-downlink configuration for the first period, and
   in the case where the uplink-downlink configuration indicate an uplink symbol and a downlink symbol in the first period, the terminal aligns transmission directions of symbols in the second period corresponding to the uplink symbol and the downlink symbol with transmission directions of the uplink symbol and the downlink symbol.

* * * * *